United States Patent [19]

Fruechte et al.

[11] Patent Number: 4,648,427
[45] Date of Patent: Mar. 10, 1987

[54] BISTABLE TWO POSITION VALVE

[75] Inventors: Kevin M. Fruechte, Fairmont, Minn.; Gary J. Andrewjeski, DeForest; Robert E. Braatz, Sun Prairie, both of Wis.

[73] Assignee: The BOC Group, Inc., Montvale, N.J.

[21] Appl. No.: 781,423

[22] Filed: Sep. 30, 1985

[51] Int. Cl.$^4$ .................. F16K 11/062; F16K 1/20
[52] U.S. Cl. .................. 137/826; 137/625.44; 251/75
[58] Field of Search ............ 251/75, 229, 862, 868; 74/47; 137/625.44

[56] References Cited

U.S. PATENT DOCUMENTS

| 224,964 | 2/1880 | Stephenson | 74/97 |
| 928,459 | 7/1909 | Kieselhorst | 251/75 |
| 1,295,638 | 2/1919 | Triggs | 251/75 |
| 2,995,043 | 8/1961 | Lusk et al. | 74/97 |

FOREIGN PATENT DOCUMENTS 747296  6/1933  France .......................... 137/625.44

Primary Examiner—Alan Cohan
Assistant Examiner—John S. Starsiak, Jr.
Attorney, Agent, or Firm—Roger M. Rathbun; Larry R. Cassett

[57] ABSTRACT

A switching mechanism and valve using the same wherein a two remote valve or switch positions are provided. The switching mechanism includes a valve operator having of outwardly extending port closures that move above a central pivot point. As the valve operator shifts between its two remote positions, each port closure closes or opens respectively a port associated with such port closure. A flat bearing surface is formed as part of the valve operator and is in a plane generally perpendicular to a line bisecting the angle between the two port closures. A roller, biased against that flat bearing surface is on a pivot arm also moveable about its remote pivotable end. The biased roller normally holds the valve or switch in one of its remote positions. As the valve operator is moved to its other remote position the roller rolls along the flat bearing surface such that no stable alignment ever occurs when the axis of the roller pivot arm is in line with a line between the pivot point of the pivot arm and the central pivot point of the valve operator.

3 Claims, 5 Drawing Figures

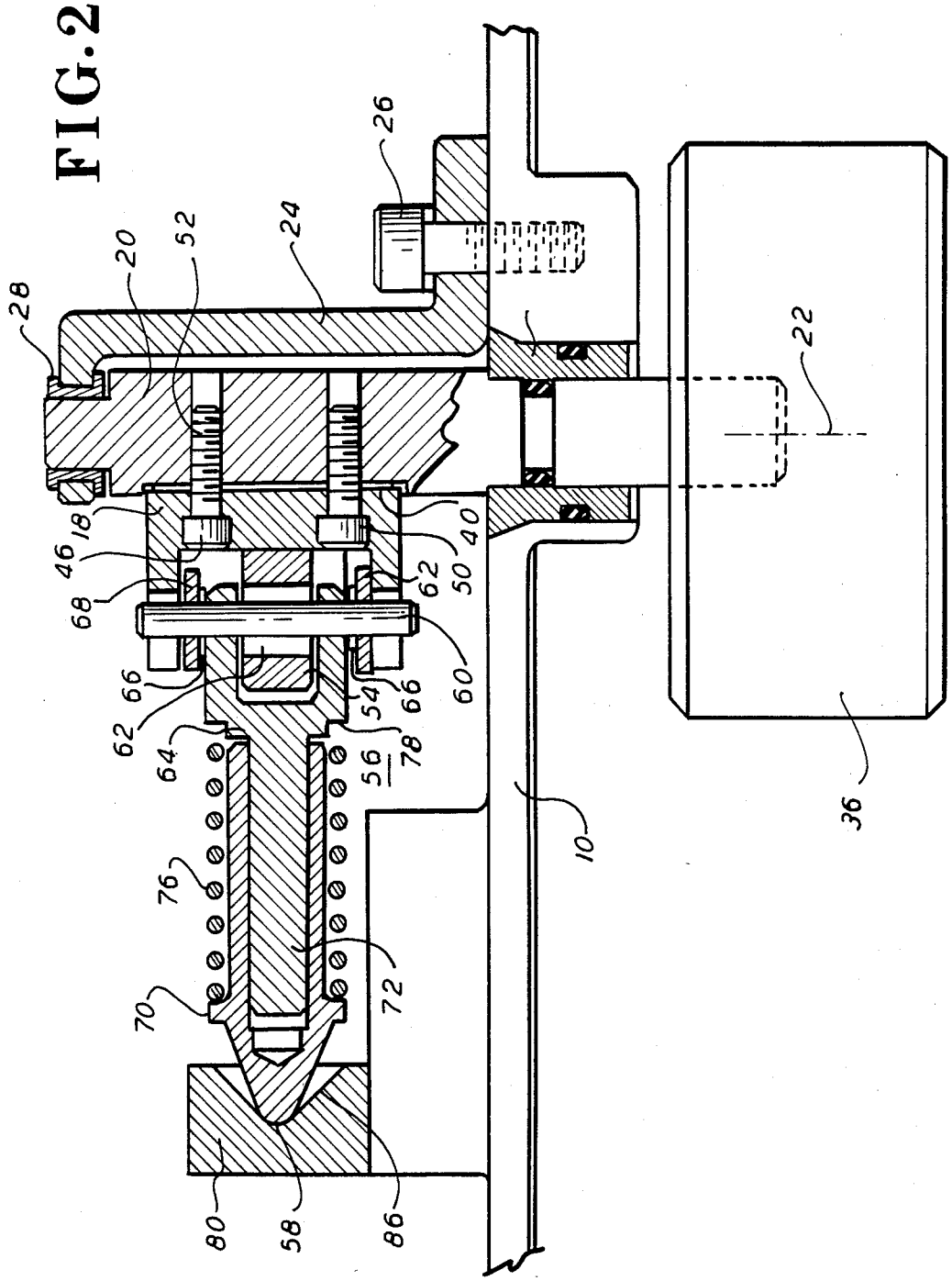

BISTABLE TWO POSITION VALVE

BACKGROUND OF THE INVENTION

The present invention relates to a bistable two position selector valve that includes a switching mechanism that prevents the valve from being placed in any stable intermediate position between its normal two remote positions.

There are many types of multi-position valves that are moveable between two positions and which are designed to avoid, to the extent possible, any stable intermediate position where the exact valve position is ambiguous. That is, in many valve applications it is important that the valve be switched between its two positions in a positive manner and that the operator is unable to leave the valve in some mid position where, for example, two inlets or outlets may be open. This is particularity true in medical applications where an operator needs to know that the path of the flow of gas is the one selected.

Typical valve mechanisms include over-center springs such as are commonly used on toggle switches and which cause the valve or switch to rapidly move from one position to the other position when the valve operator reaches a certain point in its movement.

In such cases, however, there is still a possibility that a user could move the toggle mechanism to such a position that the valve is in midstream, caught or at least momentarily held in a position not desired by the operator nor apparent from the position of the mechanism. In most such over-center spring mechanisms, an operator can thus inadvertently place the valve in an ambiguous position.

SUMMARY OF THE INVENTION

The bistable two position valve of the present invention utilizes a valve mechanism that employs a valve operator that is pivoted about a point and includes a pair of outwardly extending port closures at an angle with respect to each other and each being operable to open and close a port in a housing. As the valve operator rocks about its pivot point, one or the other of the valve closures covers its corresponding port and thus alternately opens and closes that port to the flow there through of a gas or liquid.

The valve operator has a flat, bearing surface in a plane perpendicular to a line emanating at its pivot point and bisecting the angle between the port closures.

A roller is biased against that bearing surface and is adapted to roll along that bearing surface generally along the plane of movement of the valve operator and port closures but constrained in its rolling movement to two remote positions.

The roller is attached to a spring loaded lever arm having a pivot point remote from the pivot point of the valve operator and a spring means acts to bias that roller against the flat bearing surface.

In operation, the valve is moved from one position closing one port to its other position closing the other port by rotating the valve operator about its pivot point in the desired direction. As the valve operator is rotated, the roller initially continues to exert a torque on the rotating valve operator in the direction counter to the direction of movement, that is, if released, the valve operator will return to it original position.

Continued rotation, however, will move the flat bearing surface past the point in travel where it is perpendicular to the spring loaded lever arm even though the direction of the torque or moment has not changed. Further rotation reaches the point where the roller rolls rapidly along the flat bearing surface due to its angle with respect to the plane of that bearing surface and the roller rapidly moves to its other remote position along the flat bearing surface changing the direction of torque and rapidly moving the valve to the new position. The spring loaded lever arm thus acts to change the direction of torque applied to the valve operator as it moves to its other position. At no point, however, is there a stable alignment of the pivot point of the spring loaded lever arm, the center line of the roller and the pivot point of the valve operator, thus, no stable mid position can be inadvertently or even deliberately established. Such alignment only occurs instantaneously and during the rapid movement of the roller from its one remote position to its other remote position.

BRIEF DESCRIPTION OF THE DRAWINGS

FIG. 2, is a cross sectional side view taken along the lines 2—2 of FIG. 1, and FIGS. 3A, 3B, and 3C, are a series of graphical figures showing various stages of travel of the valve operator employed in the present invention and the moments applied to the valve operator.

DESCRIPTION OF THE PREFERRED EMBODIMENT

Figure 1:
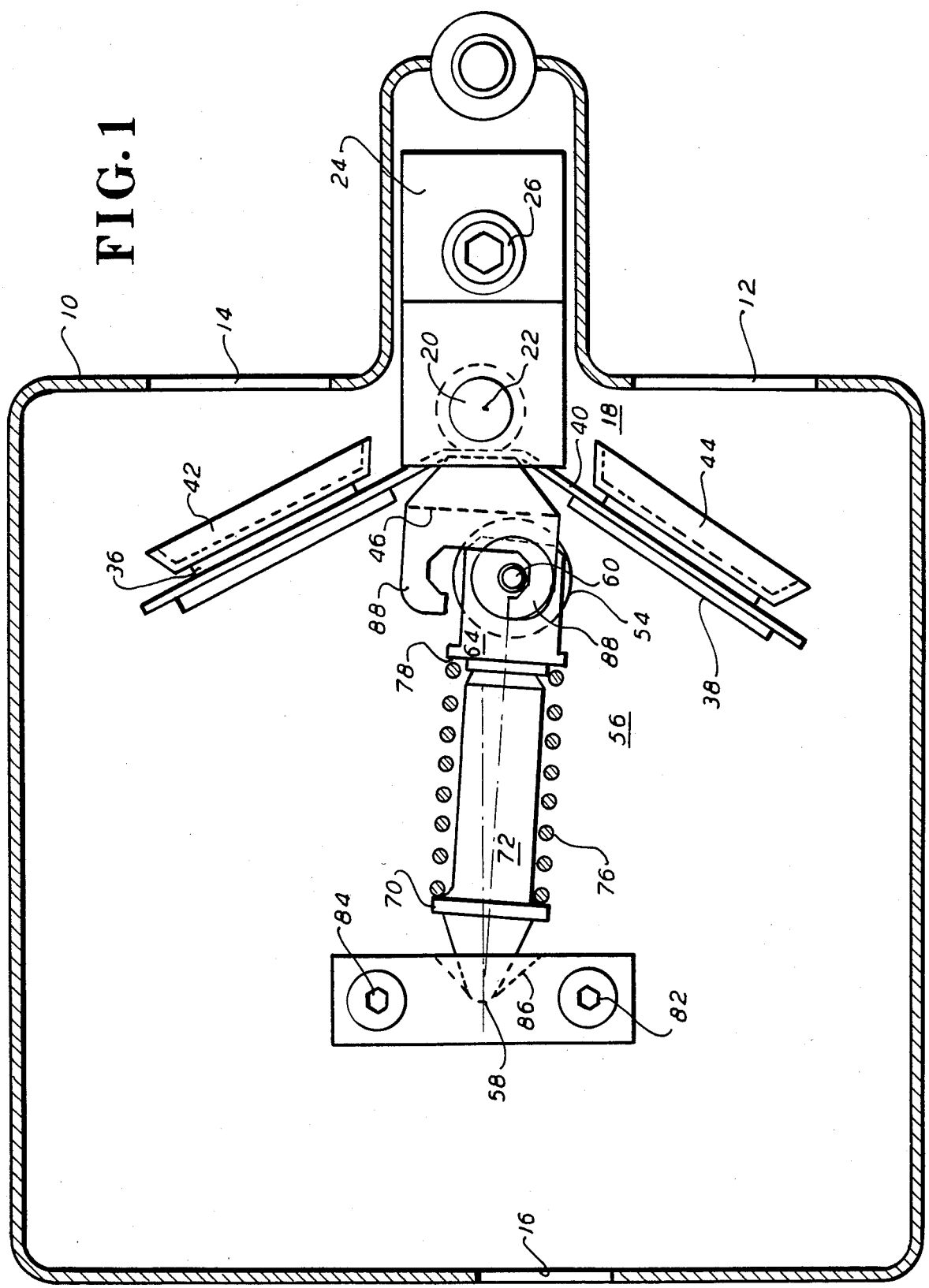
FIG. 1, is a plan view of the bistable two position valve in an unstable mid position.

Taking FIGS. 1 and 2, there is shown, a bistable two position valve constructed in accordance with this invention. The valve is held within an enclosed housing 10. As shown in the drawings for sake of simplicity, housing 10 has a pair of ports 12 and 14 formed in one end of housing 10 and a further port 16 elsewhere in housing 10. The position of port 16 can be almost anywhere in housing 10 as will later be recognized, however, the positions of ports 12 and 14 must be definitely ascertained with respect to each other. Housing 10 further includes a top and bottom necessary to make an enclosed space within housing 10 such that ports 12, 14 and 16 allow flow into and/or out from the volume of space within housing 10.

A valve operator 18 is positioned intermediate ports 12 and 14 and comprises a shaft 20 that rotates about an axis shown as a point 22 in FIG. 1 and as a line axis in FIG. 2.

Shaft 20 can be secured to the housing 10 by means of a bracket 24 which in turn is fastened to the housing 10 by means such as a cap screw 26. Bracket 24 holds one end of shaft 20 by means of a circular opening in bracket 24 in which is inserted a bearing 28, preferably of nylon. A further bearing means in the form of a bushing 30 holds the other end of shaft 20 and may be provided with suitable seals such as O-rings 32 and 34. One end of the shaft 20 extends outwardly through housing 10 and to which is secured an operating knob 36.

Extending outwardly at an angle from valve operator 18 are a pair of port closures 36 and 38 which operate to close one or the other of ports 12 and 14; when one of such ports is closed, the other is open to the flow of fluid there through. In construction, port closures 36 and 38 are generally comprised of a single metallic strip 40, preferably of phosphor bronze and having suitable holes at the ends thereof to carry rubber cap seals 42 and 44. As can be seen from FIG. 1, therefore, the rubber cap seals 42 and 44 cover and close ports 14 and 12 respectively when moved into the proper position.

Valve operator 18 further includes a flat bearing surface 46, positioned in a plane perpendicular to a line beginning at the axis 22 of shaft 20, and bisecting the angle between the port closures 36 and 38. In the preferred construction of the present bistable valve, the flat bearing surface 46 is machined on a bracket 48 that is attached securely to shaft 20 by socket head cap screws 50 and 52. Also, for convenience of assembly, the metallic strip 40 is firmly affixed to shaft 20 by sandwiching metallic strip 40 between the bracket 48 and a flat surface machined into shaft 20.

A roller 54 exerts a force against the flat bearing surface 46 and is attached to one end of a spring loaded pivot arm 56. The spring loaded pivot arm 56 has its other end pivoted about a fixed point, shown at 58 and which is remote from the axis 22 of the valve operator 18.

The actual construction of spring loaded pivot arm 56 is accomplished preferably by retaining roller 54 journaled on a roller shaft 60 by a bearing 62. Note particularly FIG. 2, the roller shaft 60 is passed through a yoke 64 and is held within yoke 64 by means such as E-type retaining rings 66. Washers 68 are positioned on roller shaft 60 outside retaining rings 66.

The spring loaded pivot arm 56 is constructed of a Delrin pivot arm sleeve 70, that slides over an extended end 72 of the yoke 64. A compression spring 76 biases roller 54 against flat bearing surface 46, by being compressed against a rim 73 on the pivot arm sleeve 70 and a shoulder 78 formed on the yoke 64.

Fixed pivot point 58 for spring loaded pivot arm 56 can be accomplished readily by a retainer 80 secured to the housing 10 by cap screws 82 and 84 and having a suitably shaped indentation 86.

Finally, a means is provided to constrain or limit the movement of roller 54 along flat bearing surface 46 between predetermined remote limits. In the preferred construction, that constraining means comprises oppositely disposed C-Shaped members 88 which engage roller shaft 60 and prevent the roller shaft 60 and, of course, roller 54 from further travel along flat bearing surface 46 and thus constrain that travel to two remote positions.

Figure 3A:
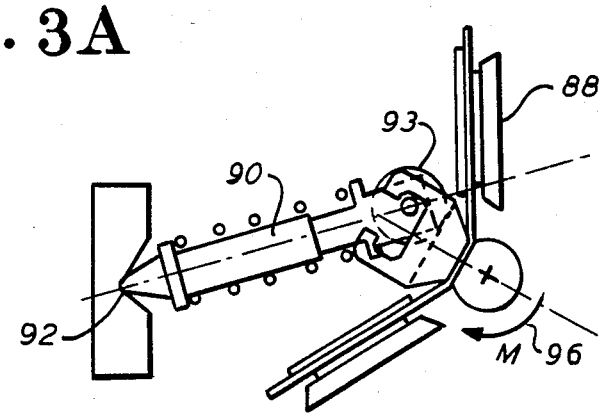
Figure 3B:
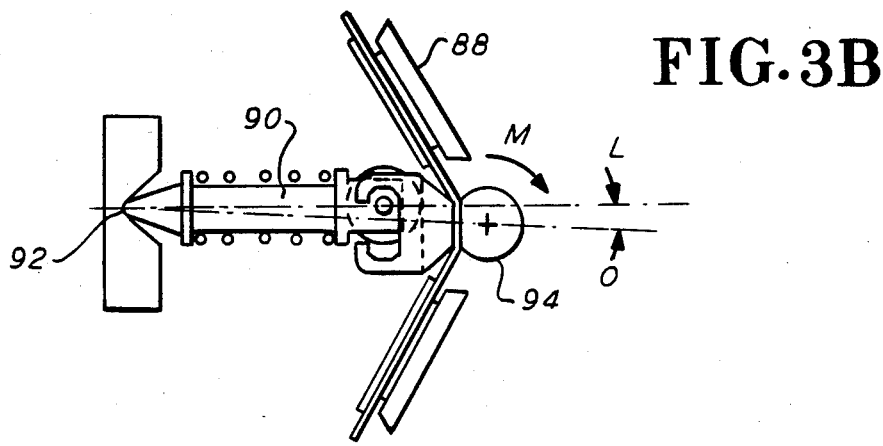
Figure 3C:
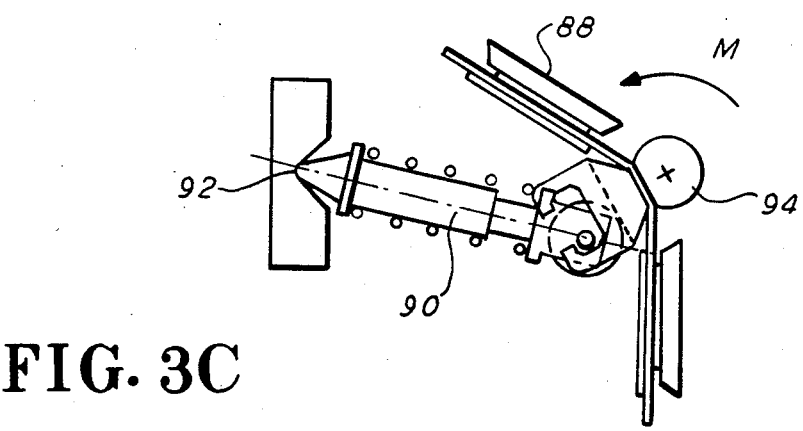

Turning now to FIGS. 3A, 3B and 3C, there is shown a series of graphic illustrations showing the principal of operation of the present bistable two position valve.

In the position of FIG. 3A, it can be easily seen that cap seal 88 would be closing its respective port (not shown) The spring loaded pivot arm 90 has its axis from its fixed end point 92 aligned such that roller 93 exerts a force against the flat bearing surface 98 that creates a moment about valve operator shaft 94 in the clockwise direction, (in the direction of the arrow 96) thus retaining the valve in that remote position.

In the position shown in FIG. 3B, the valve operator shaft 94 has been rotated counterclockwise to an intermediate position, however, the axis of the spring loaded pivot arm 90, still has a positive angle (shown as angle L) with respect to a line joining the center lines of the valve operator shaft 94 and fixed end point 92 of spring loaded pivot arm 90 and, thus, the moment on valve operator shaft 94 remains clockwise as shown by the arrow 96. In this position, therefore, if rotational force is removed from valve operator shaft 94, the valve will return to its position of FIG. 3A.

A slight further counterclockwise turning of the valve operator shaft 94, however, changes the angle such that the angle between the axis of the spring loaded pivot arm 90 and the plane of the flat bearing surface 98 passes well beyond a right angle and the roller then moves fully along that surface to its other remote position shown in FIG. 3C. Thus, the moment, again shown by arrow 96 shifts completely and rapidly to counterclockwise as the roller 93 moves. Thus there is no intermediate stable position at any time when the axis of spring loaded pivot arm 90 is aligned with the axis of valve operator shaft 94; i.e. no point where fixed end point 92, centerline of roller 93 and centerline of valve operator shaft 94 are aligned indeed the alignment occurs momentarily during the snap movement of the roller 93 along the flat bearing surface and there is no point at which roller 93, once started, will stop on that flat bearing surface thus, there is virtually no intermediate position that the valve can be set at, that will remain stable.

It will now be apparent that there has been described, an improved bistable valve and valve actuation means by providing a mechanism that prevents the valves or switch from being deliberately or inadvertently put into a stable mid-position. It should be understood that although the invention has been described with reference to a particular embodiment, modifications thereto may be made without departing from the true spirit and scope of the invention.

We claim:

1. A selector valve for switching between two positions, said selector valve comprising:
a valve housing, said valve housing having a pair of inlet ports, an outlet port and flow paths between said inlet ports and said outlet port; a valve operator pivotably affixed to said valve housing about a point, said valve operator having a pair of port closures depending outwardly therefrom at an angle with respect to each other, said valve operator being moveable by a user to two positions, said valve operator in one of its two positions having one of said port closures covering one of said inlet ports and in its other position having the other of its port closure covering the other of said inlet ports; said valve operator further having a substantially flat bearing surface facing outwardly from the valve operator pivot point, said bearing surface forming a plane perpendicular to a line bisecting the angle between said port closures, a pivot arm having one end pivotably affixed to said housing oppositely with respect to and spaced from said bearing surface, roller means affixed to the other end of said pivot arm contacting said bearing surface, and moveable along said bearing surface, bias means creating a force exerted by said roller means against said bearing surface, constraining means on said valve operator to constrain the movement of said roller means along said bearing surface to two remote positions, said roller force acting against said bearing surface in said remote positions to force said valve operator to one or the other of its two positions, said roller means having no stable intermediate position between said two remote positions along said bearing surface.

2. A selector valve are defined in claim 1 wherein said roller movement is construed between C-shaped slots formed in said valve operator at both ends of said flat surface.

3. A mechanism for providing a snap action to move a switch valve between two remote positions, said mechanism comprising:

a housing, an operator pivotably affixed to said housing about a point and movable by a user over a predetermined angle between two remote positions, said operator having a substantially flat bearing surface facing outwardly from the operator pivot point, said bearing surface forming a plane perpendicular to a line bisecting the predetermined angle of movement of said operator, a pivot arm having one end pivotably affixed to said housing oppositely with respect to and spaced from said bearing surface, roller means affixed to the other end of said pivot arm contacting said bearing surface, and moveable along said bearing surface, bias means creating a force exerted by said roller means against said bearing surface, constraining means on said operator to constrain the movement of said roller means along said bearing surface to two remote positions, said roller force acting against said bearing surface in one of said remote positions to create a torque on said operator towards one of its two remote positions and said roller force acting against said bearing surface in the other of said remote positions to create a torque on said operator towards the other of its remote positions, said roller means having no stable position between its two remote positions where zero torque is created on said operator.

* * * * *